United States Patent [19]

Swain

[11] Patent Number: 4,526,560
[45] Date of Patent: Jul. 2, 1985

[54] POWER TRANSMISSION CHAIN AND LINK THEREFOR

[75] Inventor: James C. Swain, Upper Arlington, Ohio

[73] Assignee: Borg-Warner Corporation, Chicago, Ill.

[21] Appl. No.: 540,240

[22] Filed: Oct. 11, 1983

[51] Int. Cl.³ .............................................. F16G 1/21
[52] U.S. Cl. .................................................. 474/242
[58] Field of Search ............... 474/201, 242, 244, 245, 474/240

[56] References Cited

U.S. PATENT DOCUMENTS 3,364,767 1/1968 Bredschneider et al. ...... 474/242 X
4,313,730 2/1982 Cole et al. ........................ 474/201
4,344,761 8/1982 Steuer ............................... 474/245

FOREIGN PATENT DOCUMENTS 288829 4/1928 United Kingdom ................ 474/242

Primary Examiner—James A. Leppink
Assistant Examiner—Frank H. McKenzie, Jr.
Attorney, Agent, or Firm—Robert L. Zieg

[57] ABSTRACT

An integral link-and-pivot member for an endless power transmission chain comprising longitudinal spaced web portions joined to transversely oriented joint portions, each joint portion having an arcuate or curved surface, said surfaces facing one another and being adapted to engage a like surface of an interleaved member when assembled as an endless chain and a chain assembled from such members.

9 Claims, 7 Drawing Figures

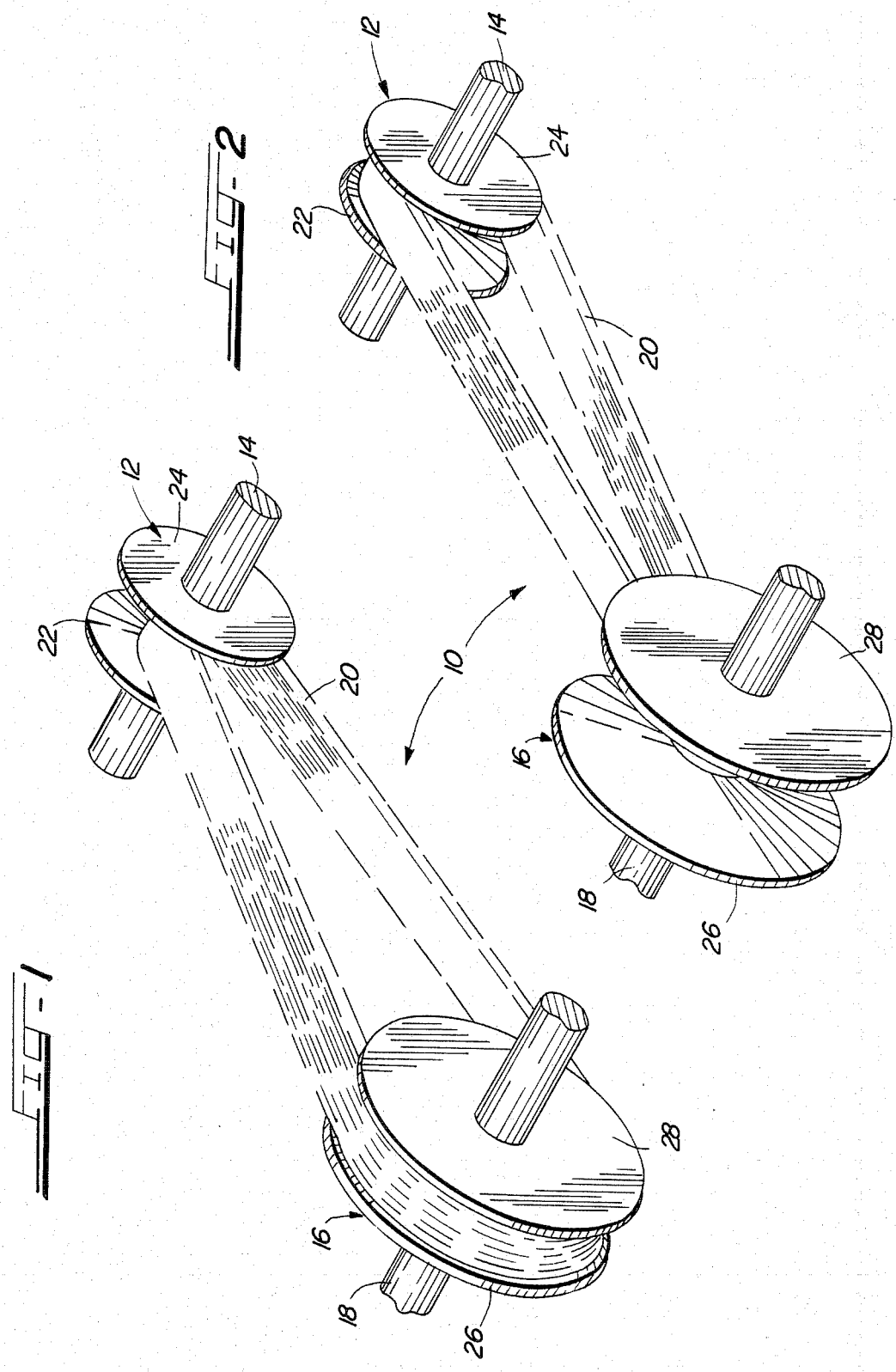

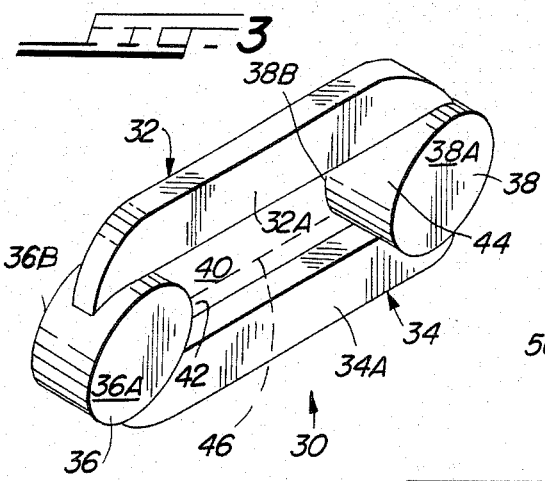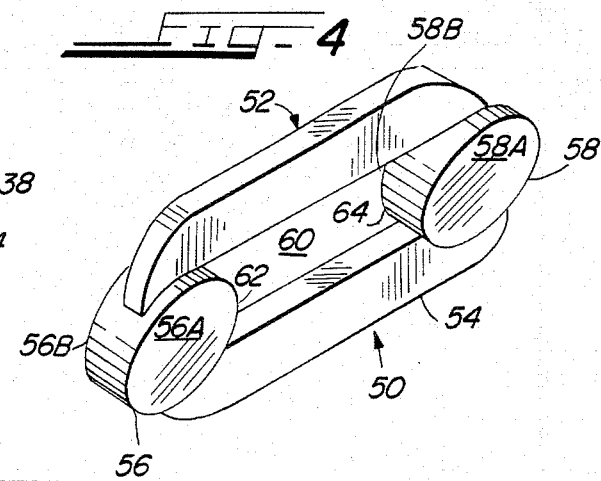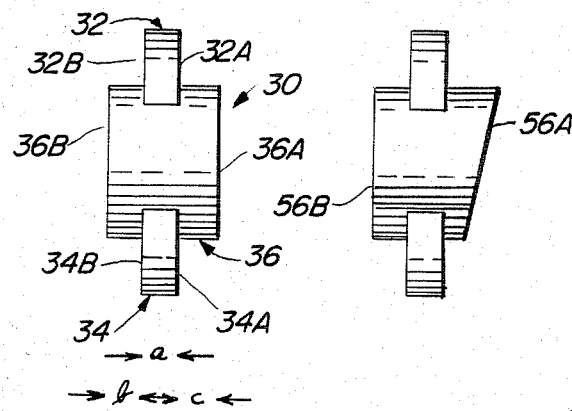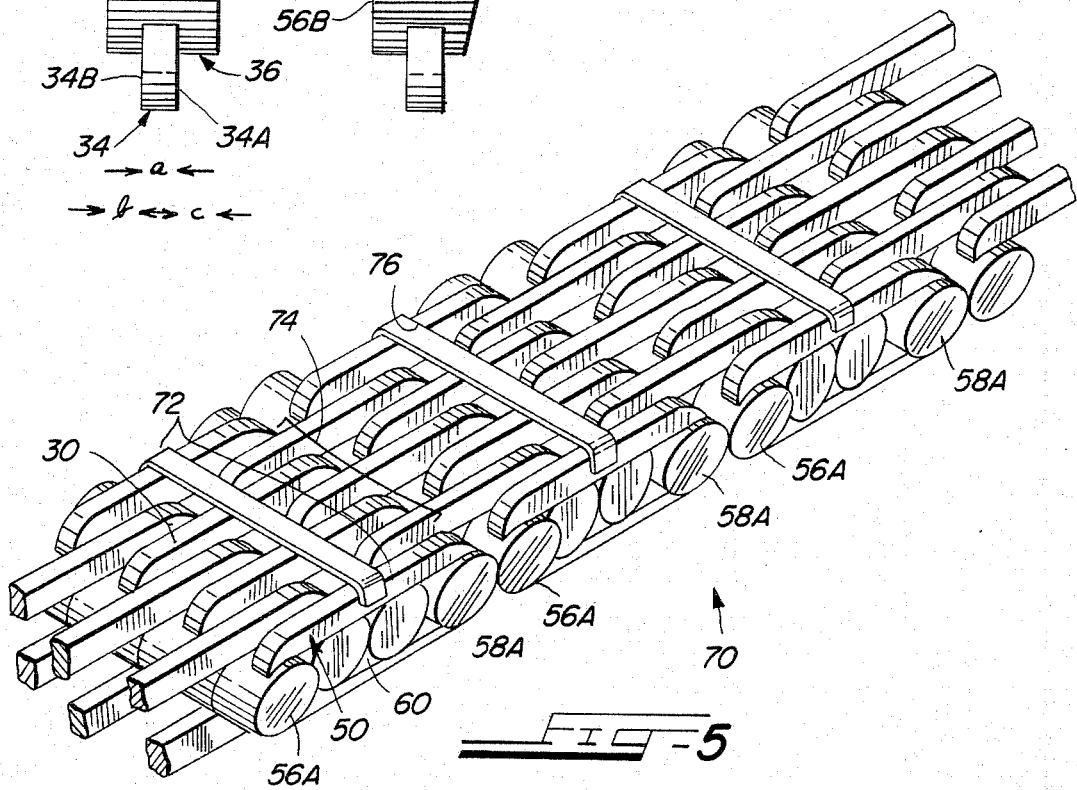

POWER TRANSMISSION CHAIN AND LINK THEREFOR

BACKGROUND OF THE INVENTION

Endless power transmission chains are frequently constructed of groups of transversely aligned links, referred to as sets or ranks of links. Each such link group is generally joined to and interleaved with the next adjacent set of links by transversely oriented pivot means, such as round pins or pin and rocker combinations, received in link openings provided adjacent the ends of each link. The openings in the sets of links are aligned with one another to receive the pivot means. Because of the interleaving of the links, there is one more link in each alternate set of links than in the two immediately adjacent sets of links. Some power transmission chains are used to drivingly interconnect the pulleys of a pulley transmission. When a chain is so used, it may be provided with drive or load blocks, each of which is positioned over the chain and between two adjacent pivot means. A chain-belt of this type is described and claimd in Cole et al, U.S. Pat. No. 4,313,730, issued Feb. 2, 1982. Another form of chain-belt to drivingly interconnect the pulleys of a pulley transmission is constructed so that the pivot means drivingly contact the pulley flanges. A chain-belt of this type is described in U.S. Pat. No. 4,344,761, issued Aug. 17, 1982.

One problem which arises when using a chain or a chain-belt for drivingly interconnecting the pulleys of a pulley transmission is the generation of noise which is disagreeable to humans. The noise caused by the impact of the chain-belt and pulleys is usually rhythmic and "bunched" in narrow frequency ranges; the noise can reach a level of about 80 dB. During impact of the chain-belt and the pulleys, the chain-belt acts in a manner similar to a rigid link chain when it impacts a sprocket because there is a radial as well as a longitudinal component of chain motion, and the radial link displacement is referred to as "chordal action." Chordal action occurs because the "pitch line" of an endless chain is polygonal, the pitch line being a series of joined straight lines, each extending between and joining the adjacent centers of articulation of the chain. The centers of articulation are those centers about which the chain pivots.

The drive or load blocks of a chain-belt as described in the Cole et al patent or the pivot members of a chain-belt as described in the aforesaid U.S. Pat. No. 4,344,761 impact the pulleys with generally the same action as that of a chain when it impacts a sprocket. Such chain-belt-pulley impact thus produces sound peaks in a regular pattern. Attempts have been made to break up the regular noise pattern, so that it is not objectionable to humans. Some attempts have been made to randomize the chain-belt impact with the pulleys, i.e., alter the previously regular time sequence of chain-belt-pulley impacts. Another suggested approach is to shorten the "pitch" of the links, where pitch is defined as the distance between points of articulation of the chain-belt. By shortening the pitch, the radial component of motion as the chain-belt engages the pulleys is reduced and the pitch line approaches a smooth, continuous line having curved portions. However, it is difficult to manufacture extremely short pitch chains which are suitable for the intended purpose, and pitches below ⅜ of an inch have been considered impractical from a manufacturing standpoint.

SUMMARY OF THE INVENTION

According to this invention, a chain or chain-belt suitable for drivingly interconnecting the pulleys of a pulley transmission and of such construction to materially reduce the regular noise pattern and its intensity when links successively impact the pulleys comprises an assembly of integral links and pivot means. By using the special link-and-pivot form of this invention, the pitch of the links can be made extremely small, even less than ⅜ of an inch. Each link of such a chain comprises a web portion composed of a pair of spaced longitudinal struts joined at their ends by transverse members which extend beyond the sides of the struts. The transverse extending members, one at each end of the link, have arcuate surfaces facing and spaced from one another. The spaced struts and the transverse members define an open space into which transverse members of interleaved links of essentially the same link form are received to form an assembly of interleaved links. The arcuate surfaces of the interleaved links engage and homologous surfaces of the next adjacent link, thereby functioning as pivot members for the assembly of links. The assembled chain links are laterally held together by clip means, which, upon removal, permits disassembly of the links.

BRIEF DESCRIPTION OF THE DRAWING

FIG. 1 is a perspective illustration of a variable pulley transmission in one drive ratio, the pulleys being drivingly connected by a continuous belt or chain-belt;

FIG. 2 is a perspective illustration, similar to FIG. 1 but with the pulley transmission in another drive ratio;

FIG. 3 is a perspective illustration of one form of a chain link constructed according to this invention;

FIG. 3A is an end view of the chain link of FIG. 3;

FIG. 4 is a perspective illustration of a chain link similar to that of FIG. 3 but suitable for use as one of the outside links in a chain-belt;

FIG. 4A is an end view of the chain link of FIG. 4; and

FIG. 5 is a perspective illustration of a portion of a chain-belt constructed of links of the types illustrated in FIGS. 3 and 4.

DETAILED DESCRIPTION OF THE PREFERRED EMBODIMENT

FIGS. 1 and 2 illustrate a variable cone-pulley transmission 10 in the two extreme drive ranges. Transmission 10 comprises a pulley 12 connected to a shaft 14, and a pulley 16 connected to a shaft 18; the pulleys are drivingly connected by a belt or chain-belt 20. The belt 20 engages the flanges 22 and 24 of pulley 12 and the flanges 26 and 28 of the pulley 16. One shaft is a drive shaft and the other shaft is a driven shaft. Accordingly, with shaft 14 as the drive shaft, an underdrive ratio range is depicted in FIG. 1 and an overdrive ratio drive is depicted in FIG. 2.

FIGS. 3 and 3A illustrate a link-and-pivot assembly 30 constructed according to this invention. The link comprises a web portion including a pair of spaced, longitudinal struts 32 and 34 joined to spaced end joint portions 36 and 38; the end joint portions extend transversely beyond the sides 32A, 32B and 34A, 34B of the struts 32 and 34, see especially FIG. 3A. The struts and the end joint portions collectively define an open space 40. The end joint portions 36 and 38 are formed with an arcuate or curved rocker surface 42 and 44, respectively, facing one another. The end joint portions have respective side surfaces 36A, 36B and 38A, 38B which are generally perpendicular to the arcuate wall extent of the end joint portions. Thus each end joint portion of link 30 resembles a generally cylindrical body. The portions 36 and 38 preferably extend from both sides of the struts a distance slightly less than the thickness of one of the struts and can be of right circular cylindrical shape, oval shape, elliptical shape, composed of convexly curved walls joined by flat, top surfaces, or other shape, so long as the rocker surfaces are arcuate or curved. Generally, an oval shape is preferred. The pitch of a link, such as link 30, is the distance on a longitudinal centerline 46 (shown as a broken line) through the link between the rocker surfaces 42 and 44, the intersection of the line 46 and the rocker surfaces 42 and 44 being the points of articulation when the chain is assembled as described.

An ideal proportion is for b and c (FIG. 3A) to be just slightly more than a/2. In that case the load carrying longitudinal struts are closely spaced in the transverse direction and the full tensile capacity of the belt is realized.

FIGS. 4 and 4A illustrate a link 50 generally similar to link 30 of FIGS. 3 and 3A. Link 50 comprises a web portion including a pair of spaced, longitudinal struts 52 and 54 joined to spaced end joint portions 56 and 58 which extend transversely of the struts 52 and 54. The struts and the end joint portions together define an open space 60. The end joint portions 56, 58 are formed with respective arcuate rocker surfaces 62 and 64 facing one another. The respective side surfaces 56A and 58A of the end joint portions 56, 58, as better seen in FIG. 4A, are chamfered or beveled at the appropriate angle to engage pulley flanges, such as flanges 22, 24, 26, and 28 of pulleys 12 and 16 shown in FIGS. 1 and 2. In present commercial systems this bevel angle is about 11°. Side surfaces 56B and 58B are not beveled. Thus end joint portions 56, 58 are slightly different than the end joint portions 36 and 38 of the FIG. 3 link, because one side or end surface is not perpendicular to the axis of the end joint portion. However, the cross-sectioned shape of these end portions are the same.

The chain-belt 70 of FIG. 5 is constructed of a mixture of links 30 and 50, the latter being the outside links, so as to have the angled end side surfaces 56A and 58A along the edges of the chain-belt assembly. The links are arranged in sets 72 and 74 with the sets 72 having one more link than the sets 74. Every other set of links (that is sets 72) consists of two outside links 50 and one or more inside links 30. The intervening link sets 74 include only inside links 30, because the outside links of sets 74 do not contact the pulley flanges. The sets of links 72 and 74 are retained in position by means of generally C-shaped clip members 76 engaging the struts 52 or 54. The open spaces 40 and 60 receive the transverse end portion of an interleaved link, so that the arcuate rocker surfaces of one link rockingly engage a corresponding arcuate surface of an interleaved link, thus permitting articulation of the assembly.

The pitch can be as small as twice the longitudinal length of the end joint portions plus a small clearance to permit pivoting of the arcuate, engaging surfaces, and the end joint portions can be of substantial height compared to the length of the links. This is not possible with the usual chain construction in which the links are formed with spaced apertures to receive separate pivot members. For example, it is possible to construct a chain with a pitch of about 0.13 inch by making the end joint portions 1/16 inch thick and the overall length of a link just slightly in excess of 0.25 inch. This is a reduction by about ⅓ of the link length from that length (⅜ inch) previously considered the minimum for practical manufacturing. Therefore, because of the extremely short pitch of the links, the assembled chain acts similar to an elastomer V-belt, and chordal action is reduced resulting in a reduction in the noise level generated by the impact of the chain and the pulley flanges, when compared with conventional chains.

Links according to this invention are preferably made of steel, and can be cold formed from strip steel, machined from blocks of steel, or produced by powder metallurgy methods. They can be case hardened if desired. The end joint portions of the outside links in link sets 72 can be machined (before being case hardened) to provide the angled surfaces 56A and 58A after the chain is assembled. However for some uses, as for drivingly interconnecting pulleys other than cone pulleys, the chain can be constructed of only one type of links, i.e., links 30. The steel links are preferably heat treated to improve their strength, and the clips 76 which maintain the sets of links in their respective positions are preferably made of spring steel.

The appended claims are intended to cover reasonable equivalents of the invention.

I claim:

1. An endless power transmission chain comprising a plurality of unitary, one piece link and pivot members, the improvement wherein each of said members has a web portion and a pair of spaced pivot-surface means integral with said web portion, said web portion being of a thickness less than that of said pivot surface means, said web portions and pivot surface means collectively defining an open space.

2. An endless power transmission chain as recited in claim 1, wherein each pivot-surface means is arcuate and cooperates with a corresponding arcuate surface of another, adjacent member.

3. An endless power transmission chain comprising a plurality of sets of interconnected link-and-pivot members, each member having a pair of spaced-apart transversely oriented joint portions joined by a pair of longitudinal, spaced web portions of a thickness less than that of said transversely oriented joint portions, each joint portion having a curved surface, at least a part of the joint portion of the next adjacent link-and-pivot members being received between said spaced web portions members with its curved surface engaging the adjacent curved surface of an adjacent member and permitting pivotable motion between the next adjacent and interconnected sets of link-and-pivot member.

4. An endless power transmission chain as recited in claim 3, wherein each curved surface is convex.

5. An endless power transmission chain constructed of sets of link-and pivot members as defined in claim 1, each alternate set of members having one more member than the other sets of members.

6. An endless power transmission chain as recited in claim 5, constructed to drivingly interconnect cone pulleys of a pulley transmission, wherein each set of link and pivot members is defined by outermost members, said outermost members each defining an exterior joint portion, the exterior joint portions of the outermost members having beveled ends to drivingly engage the pulleys of the transmission.

7. An endless power transmission chain as recited in claim 6, wherein the exterior joint portions are ground to provide the beveled ends.

8. An one piece link-and-pivot member for an endless power transmission chain comprising a pair of spaced longitudinal web portions and a pair of transversely oriented joint portions, said joint portions extending laterally from said web portions and each having a curved surface facing one another.

9. An integral link-and-pivot member for an endless power transmission chain as recited in claim 8, in which each curved surface is convex.

* * * * *

UNITED STATES PATENT AND TRADEMARK OFFICE
CERTIFICATE OF CORRECTION

PATENT NO. : 4,526,560
DATED : July 2, 1985
INVENTOR(S) : JAMES C. SWAIN

It is certified that error appears in the above—identified patent and that said Letters Patent is hereby corrected as shown below:

Column 4, line 33, change "link and pivot" to -- link-and pivot --.

Signed and Sealed this

Nineteenth Day of November 1985

[SEAL]

Attest:

Attesting Officer

DONALD J. QUIGG

Commissioner of Patents and Trademarks